US011159391B2

(12) United States Patent
Aiello et al.

(10) Patent No.: US 11,159,391 B2
(45) Date of Patent: Oct. 26, 2021

(54) INSTANTIATION OF A TELCO BLOCKCHAIN IN A NFV ENVIRONMENT

(71) Applicant: Hewlett Packard Enterprise Development LP, Houston, TX (US)

(72) Inventors: Fabio Aiello, Rome (IT); Gary Dean Iosbaker, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 290 days.

(21) Appl. No.: 16/242,925

(22) Filed: Jan. 8, 2019

(65) Prior Publication Data

US 2020/0220791 A1 Jul. 9, 2020

(51) Int. Cl.
G06F 15/173 (2006.01)
H04L 12/24 (2006.01)
G06F 9/455 (2018.01)

(52) U.S. Cl.
CPC .......... *H04L 41/5025* (2013.01); *G06F 9/455* (2013.01); *H04L 41/069* (2013.01); *H04L 41/12* (2013.01); *H04L 41/145* (2013.01)

(58) Field of Classification Search
CPC .................. H04L 41/5025; H04L 41/069
USPC ......................................................... 709/224
See application file for complete search history.

(56) References Cited

U.S. PATENT DOCUMENTS

| | | | |
|---|---|---|---|
| 9,967,745 B2 | 5/2018 | Marquardt et al. | |
| 2017/0279774 A1 | 9/2017 | Booz et al. | |
| 2019/0287146 A1* | 9/2019 | Maitland | H04L 41/12 |
| 2021/0011753 A1* | 1/2021 | Opsenica | G06F 9/45558 |
| 2021/0091994 A1* | 3/2021 | Meirosu | H04L 12/1457 |

FOREIGN PATENT DOCUMENTS

| | | | |
|---|---|---|---|
| EP | 3284213 | 2/2018 | |
| WO | WO-2018109598 | 6/2018 | |
| WO | WO-2018153485 A1 * | 8/2018 | G09C 1/00 |
| WO | WO-2018153486 A1 * | 8/2018 | H04L 9/0847 |

OTHER PUBLICATIONS

Langberg Ehud, "Blockchains in Mobile Networks", 2017, Retrieved on May 30, 2018, 16 Pgs. http://e.huawei.com/fr/publications/global/ict_insights/201703141505/core-competency/201703150928.

(Continued)

*Primary Examiner* — Hee Soo Kim
(74) *Attorney, Agent, or Firm* — Sheppard Mullin Richter & Hampton LLP

(57) ABSTRACT

A system and method are provided for instantiating a blockchain in a telecommunications network. The method includes identifying a smart contract having S transactions; encoding the S transactions into a sub-blockchain; selecting K edge gate nodes of the telecommunications network from among N of the edge gate nodes according to an ant colony system algorithm, wherein each of the edge gate nodes operates at an edge of the telecommunications network, and wherein S≤K; and allocating the sub-blockchain as one or more virtual network functions among the K edge gate nodes.

20 Claims, 9 Drawing Sheets

(56) References Cited

OTHER PUBLICATIONS

Gao et al., "A multi-objective ant colony system algorithm for virtual machine placement in cloud computing", Journal of Computer and System Sciences archive, vol. 79, Issue 8, Dec. 2013, pp. 1230-1242.
Lucrezia et al., "Introducing Network-Aware Scheduling Capabilities in OpenStack", In: First IEEE Conference on Network Softwarization (Netsoft 2015), London, UK, Apr. 2015, 6 pages.
Mobile Edge Computing (MEC): Deployment of Mobile Edge Computing in an NFV environment, "ETSI GR MEC 017 V1.1.1 (Feb. 2018)", Feb. 2018, pp. 1-32.
Prakash et al., "PGA: Using Graphs to Express and Automatically Reconcile Network Policies", SIGCOMM '15, Aug. 17-21, 2015, 14 pages.
Fedak, G. et al., Blockchain-Based Decentralized Cloud Computing, (Research Paper), Apr. 24, 2018, 40 Pgs.
Stanciu, A., Blockchain Based Distributed Control System for Edge Computing, (Research Paper), May 3, 2017, 5 Pgs.
Xiong, Z. Et al., When Mobile Blockchain Meets Edge Computing, (Research Paper), Apr. 11, 2018, 16 Pgs.
Zhu, H. et al., EdgeChain: Blockchain-Based Multi-Vendor Mobile Edge Application Placement, (Research Paper), Jan. 12, 2018, 9 Pgs.

\* cited by examiner

INSTANTIATION OF A TELCO BLOCKCHAIN IN A NFV ENVIRONMENT

BACKGROUND OF THE INVENTION

With the proliferation of mobile computing devices, the digital services provided by cellular and telecommunications ("telco") networks are finding increasing demand in the marketplace. In response, Communications Service Providers (CSPs) are showing a strong interest in blockchain as an enabling technology within their own software infrastructure, as well as a way to offer new digital services to consumer and enterprise customers.

DETAILED DESCRIPTION

Figure 1:
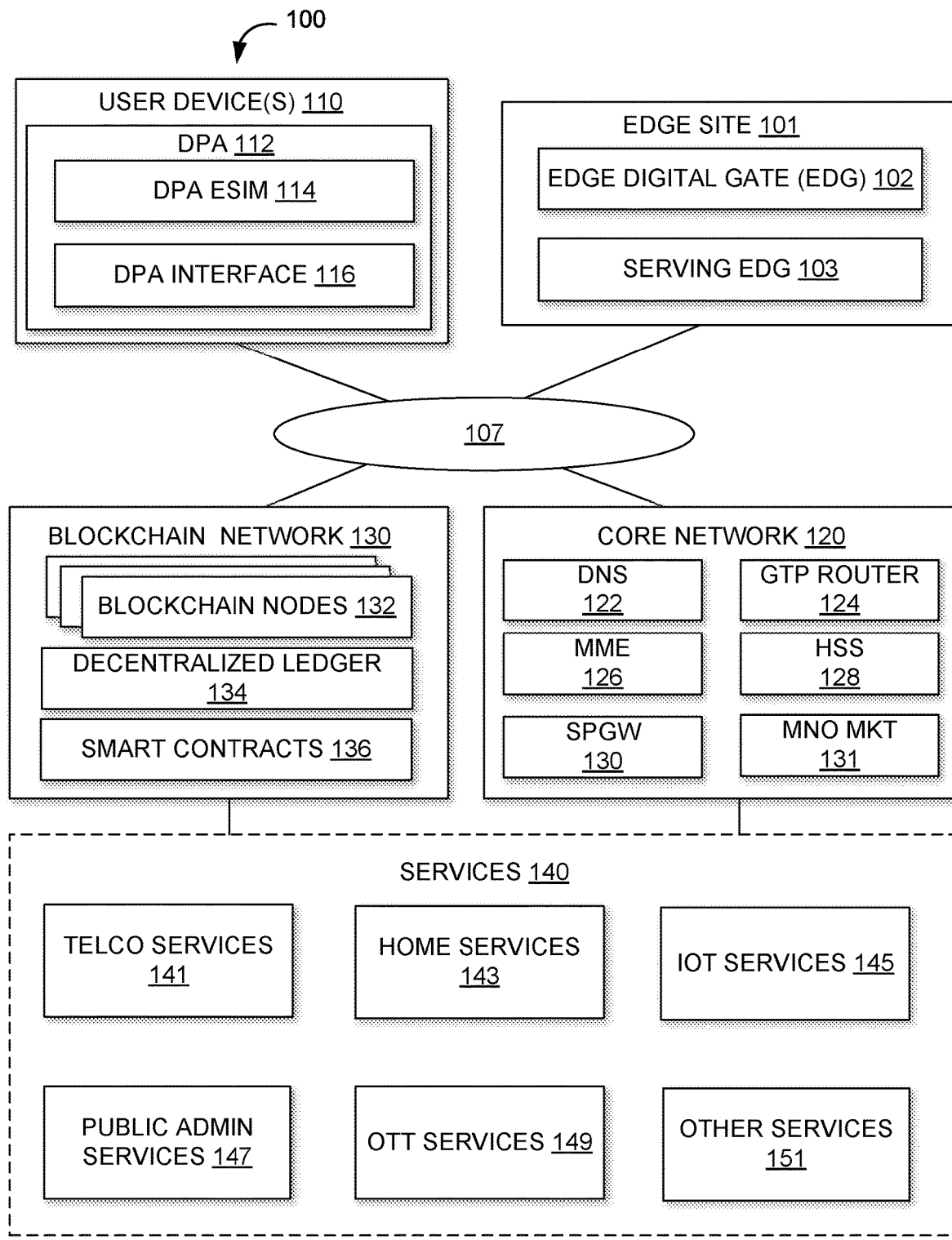
FIG. 1 illustrates a system of providing access to subscribed services, which may be blockchain-based, in a telecom network, according to an implementation of the disclosure.

Embodiments of the disclosed technology provide a system and method to identify and position a telco blockchain in a distributed, virtualized environment. According various embodiments, a telco blockchain may be implemented using existing Network Functions Virtualization (NFV) orchestration techniques, with the addition of Ant Colony System (ACS) and K-Means algorithms in the service orchestration and management and orchestration (MANO) layers of the ETSI framework. This approach allows blockchain-enabled edge nodes to be used as a particular type of virtualized resource that can be optimally positioned using a standard orchestrator. Blockchain-enabled edge nodes can be deployed/released when and where needed based on available power, availability of physical resources in the form of compute, memory, and network access, as well as current network conditions. The self-organized and auto adaptive nature of ACS allows the system to react in an efficient manner to changes in the environment topology. For example, in the case of a fault with a transit edge digital gate ("EDG") node due to an underlying virtual machine (VM) failure, the self-adaptive nature of ACS allows a blockchain controller application (BCA) to work around the fault by selecting an alternate application routing path without invoking orchestrators for networking re-configuration.

Embodiments provide an edge digital gate ("EDG") configured with entitlement services, universal identity repositories, and connection concentrator functions. The universal identity repositories each include a shared cache that together with other shared caches form a shared data environment ("SDE"). The SDE provides a distributed and shared cache used to chain together EDGs for operation as a blockchain network. The SDE may be check-pointed by stateless Virtual Network Functions ("VNFs") executing on the EDGs responsive to service demand and access, thus facilitating distributed consensus for validating each transaction. Through SDE the stateless VNFs disperse transaction-status based on a smart contract.

The blockchain network, formed from edge digital gates that may operate at an edge of the telecom network, may operate as a distributed state machine that stores and validates status and transactions based on smart contracts executed on behalf of entities that connect through the telecommunication ("telecom") network through their devices. The transactions may relate to access, enrollment, and service provision for various blockchain-based services that may be provided by a telecom network operator (also referred to interchangeably as a Mobile Network Operator ("MNO,") or Communications Service Provider ("CSP") or third parties that provide services over the telecom network.

When an entity attempts to access a blockchain-based digital service via the telecom network, one or more EDGs may be selected to perform entitlement, record an identity of the subscriber, and perform connection concentrator functions for subscriber communications. Smart contracts may enforce transactions associated with blockchain-based digital services. For example, automated value exchange may be executed for access to the services and/or subscriptions to such services may be validated. The activity may be recorded on a decentralized ledger of a blockchain network, generating a cookie trail of activity of the subscriber.

FIG. 1 illustrates a system 100 of providing access to services 140, which may be blockchain-based, in a telecom network, according to an implementation of the disclosure. System 100 may include one or more user devices 110, an edge site 101 (typically multiple edge sites 101), a core network 120, blockchain network 130, and/or other components. The telecom network (not expressly illustrated) may include the core network 120, the edge site 101, one or more access points such as base stations to which the user devices 110 connect to access a Wide Area Network such as the Internet, and/or other telecom components. Each of the components of system 100 may be connected to one another by way of wireless and/or wired connections via a network 107.

The one or more user devices 110 may include devices that access the services 140 through the telecom network. For example, the user device 110 may include an Internet of Things ("IoT") device, tablets, laptops, smartphones, smartwatches, and/or other devices that can access the services 140. Each device 110 may access multiple services 140. A given user may be associated with multiple user devices 110. The services 140 may be offered by third parties and/or the MNO of the telecom network. The services 140 may include one or more telco services 141, one or more home services 143, one or more Internet of Things (IoT) services 145, one or more public admin services 147, one or more Over-the-Top ("OTT") services 149, and/or other services 151. It should be understood that although services 140 are illustrated together, services 140 are not necessarily hosted/ provided by a single or co-located services providers.

As will be described in more detail, the user device 110 may execute a Digital Passport Application (DPA) 112 implementing a digital passport that represents a digital entity across the different services 140. The DPA 112 may include an eSIM component of the DPA 112 and an interface component of the eSIM. The eSIM component will be referred to as the DPA eSIM 114 and the interface component will be referred to as the DPA interface 116. As such, the DPA 112 may implement a user-centric, rather than service-centric, ecosystem for access control and service provision. For example, the digital passport application links virtual identifiers (such as login usernames) used to access each service 140 to a universal digital identifier. Each digital passport application executing on each user device 110 may implement a digital persona that represents an entity defined by the virtual identifiers linked to a digital identifier through a public key, and connected to a physical identifier through a private key. Entities may digitally sign data such as transactions to be written to the decentralized ledger 134 or various tokens described herein using the private key. Using the DPA 112, an entity may access different services 140 through a single digital persona.

In some implementations, the services 140 may be blockchain-based in that they may be transacted using the blockchain network 130. For example, one or more smart contracts 136 of the blockchain network 130 may be used to define terms of accessing the services 140. In this example, access to and use of the services 140 may be automatically executed by the smart contracts 136. In some instances, activity of users using the services 140 may be recorded on one or more decentralized ledgers 134 of the blockchain network 130. In these and/or other ways, the services 140 may be blockchain-based. Services 140 that are blockchain-based will also be referred to as "blockchain-based services." The blockchain network 130 includes a plurality of blockchain nodes 132 that communicate with one another. Such communication may be via a peer-to-peer communication protocol. Each of the blockchain nodes 132 store a full or partial copy of the decentralized ledger 134. The decentralized ledger 134 may be composed of ledger blocks that each refer back to a hash of a prior ledger block. Each blockchain node 132 may be programmed with a blockchain agent that includes logic for interacting with other blockchain nodes, writing transactions, writing ledger entries, participating in consensus decisions, and/or performing other blockchain related functions.

In some instances, the smart contracts 136 may specify terms agreed to by various parties, such as an entity that accesses one or more of the services 140 and providers of the services. In some instances, each smart contract 136 may include logic or rules for automatically executing the terms of the contract, including access control, service level agreement terms, subscriptions, and/or other aspects of service provision. One or more components of the telecom network may be a blockchain node 132 of the blockchain network 130. In other words, a component of the telecom network may be programmed with the blockchain agent. For example, an edge digital gate (EDG) 102 may act as a blockchain node 132.

The cellular network may include one or more edge sites 101. Each edge site 101 may include one or more EDGs 102 and one or more serving EDGs 103. A serving EDG 103 is an EDG to which a User-DPA (Digital Passport Application) is connected/redirected. A serving EDG 103 provides a listing of blockchain-based services to requesting user devices, and is involved in token reconstruction, by collecting all the relevant sub-tokens from EDG 102 nodes that have them, reassembling the token from the collected sub-tokens, and comparing the reassembled token with the token provided by the User-DPA.

From a user perspective, the disclosure provides a secure and trusted user-centric access to the digital services incubated by a telecom blockchain, as well as a simplified user experience in discovering, enrolling and using blockchain-based digital services. The disclosure further provides an agnostic user experience from a wide range of devices (such as IoT devices, tablets, laptops, smartphones, smartwatches, etc.) and their location. The user-centric approach of the disclosure uses a universal identifier, allowing identity processes to operate on a global, de-perimetered scale, binding between physical identifiers, digital identifiers, and virtual identifiers that permit a user to select and invoke the correct digital identity to access corresponding resources.

The core network 120 may include a Domain Name System ("DNS") 122, a GPRS Tunneling Protocol ("GTP") router 124, a Mobility Management Entity ("MME") 126, a Home Subscriber Server ("HSS") 128, a Packet Data Network Gateway ("SPGW") 130, an MNO marketplace ("Mkt") 131, and/or other components. DNS 122 may manage Internet Protocol addresses for various system components. GTP router 124 may route requests from the user device 110 to an appropriate EDG 101. MME 126 may include key control for authenticating a user device 110 at HSS 128. HSS 128 may authenticate a requesting user device 110 to join the cellular network. Other types of authentication servers may be used as well, depending on the type of cellular network used. SPGW 130 may manage communications between 3GPP technologies and non-3GPP technologies.

MNO marketplace ("Mkt") 131 may include a listing of all available services 140 accessible through a cellular network of the MNO. Different MNOs may have different MNO marketplaces 131. At least some of the available services may include blockchain-based services.

Figure 2:
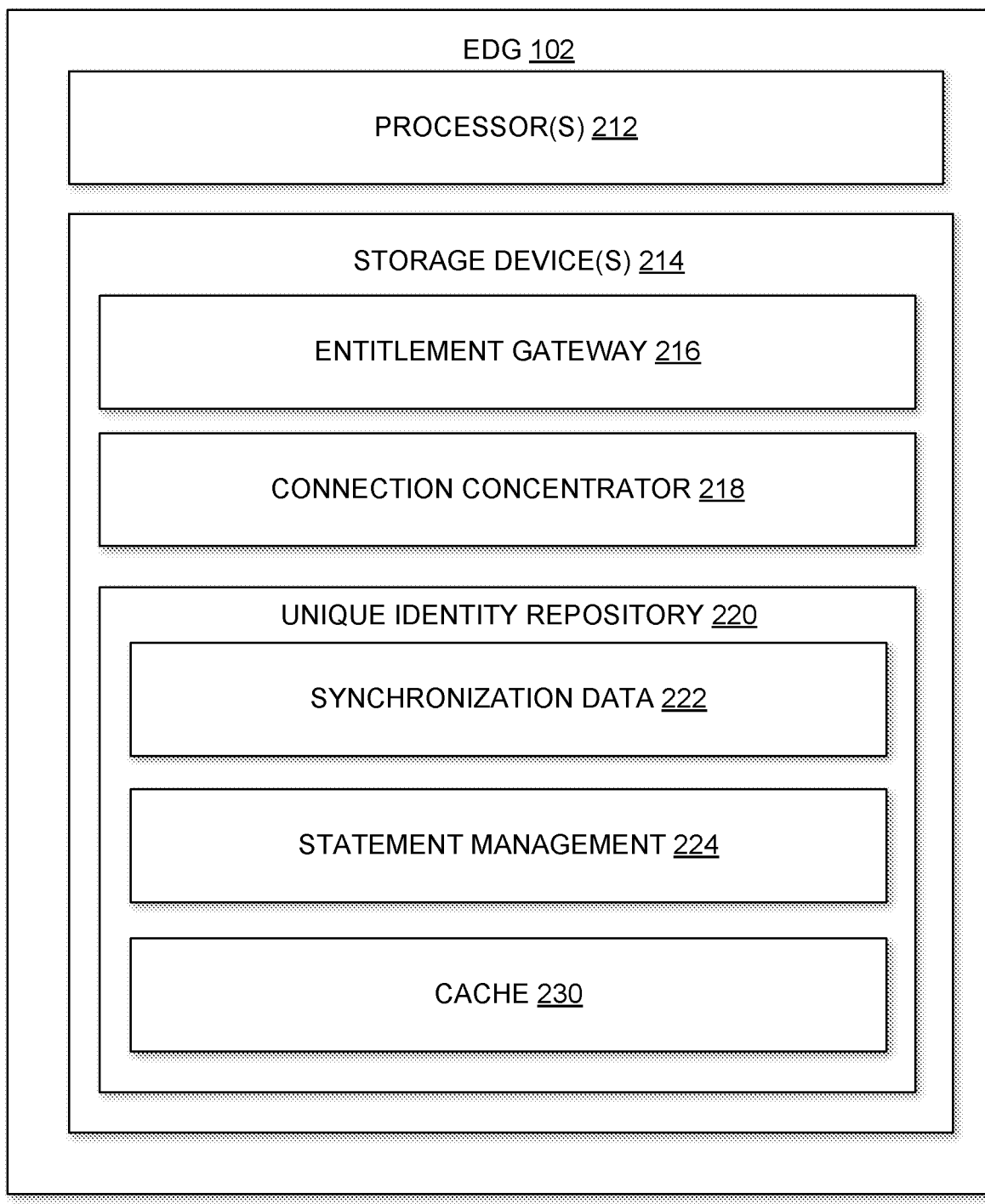
FIG. 2 illustrates an example of an edge digital gate, according to an implementation of the disclosure.

FIG. 2 illustrates an example of an EDG 102, according to an implementation of the disclosure. EDG 102 may include one or more physical processors 212, one or more storage devices 214, and/or other components. The one or more storage devices 214 may store various instructions that program the processors 212. For example, the one or more storage devices 214 may include an entitlement gateway 216, a connection concentrator 218, and/or other instructions.

The entitlement gateway 216 may use one or more stateless Virtual Network Functions ("VNFs") that perform entitlement functions. Thus, an EDG 102 may determine—at an edge using Mobile Edge Computing principles—whether a given entity, represented by the DPA 112 for the entity, is entitled to access services 104, and in particular, blockchain-based services. The unique identity repository 220 may act as a storage VNF. As such, each EDG 102 may act as a micro-database and network edge validator node in a person-2-person ("P2P") transaction. Each EDG 102 may be deployed and released as-needed. The stateless VNF and storage VNF may be implemented by VNF and 3GPP UDR-UDSF technologies. As such, they may be loaded and targeted to appropriate EDGs 102 as needed.

When a user device 110 accesses the telecom network, the DPA 112 may request access to one or more of the services 140 on behalf of the user represented by the DPA. The entitlement gateway 216 may enroll the DPA 112 to access the one or more services 140. Such enrollment may include obtaining virtual identities associated with the services 140. Upon enrollment, the entitlement gateway 216 may generate a token for the DPA 112, which digitally signs the token using its private key. The token is a collection of data that includes, without limitation, user data, transaction data, and/or other data relating to the user represented by the DPA 112. The user data may include information relating to the digital persona of the user, including virtual identities. The transaction data may include information indicating usage of various services 140. As such, the token may be updated each time the user accesses one or more of the services 140 and may represent a trail of activity by the user (more particularly, the DPA 112 of the user) with respect to services 140. The token may be implemented as multiple tokens such as an access token that is used to authenticate the user/DPA 112 and a service token that is used to store user activity with respect to a service 140. The access token may store the user data and the service token may store the transaction data.

Each EDG 102, to which the DPA 112 is directed for providing access to a requested service 140, may obtain the token from the DPA 112 and authenticate the token for ensuring that the DPA 112 is entitled to access the requested service 140. Upon authentication and access provision, the EDG 102 may update the token indicating such access. In some instances, the EDG 102 may update the token to indicate user activity with respect to the requested service 140. In some instances, the EDG 102 may update the token to indicate transactions executed in association with the requested service 140. For example, each time a transaction is executed using a smart contract 136, the responsible EDG 102 may update the token with a transaction identifier or other transaction information. In these instances, the token may store a record of transactions.

In some instances, the token may be split into one or more (typically multiple) sub-tokens that are each propagated to multiple EDG 102 nodes on the blockchain network 130. Each of the multiple EDG 102 nodes may store its respective sub-token. Thus, the token as a whole may be stored as multiple sub-tokens each on a different EDG 102 node. Because the user device 110 may access different services 140 from different parts of the telecom network, a trail of sub-tokens may indicate a path of activity (serviced by different EDG 102 nodes along the path) on the network. The path and related data may be stored as synchronization data 222 described below. In these instances, when the token is to be authenticated, a serving EDG 102 may obtain the token from the DPA 112, collect all the relevant sub-tokens from EDG 102 nodes that have them (consulting the synchronization data 222, for example), reassemble the token from the collected sub-tokens, and compare the reassembled token with the token provided by the DPA 112. In this manner, multiple EDG 102 nodes may participate in authenticating and updating the token.

The connection concentrator 218 may establish connections to the telecom network based on a user data plan function. As such, an EDG 102 may enforce user data plans.

The one or more storage devices 214 may also include a unique identity repository 220. The unique identity repository 220 may include synchronization data 222, state management 224, and/or other data. The unique identity repository 220 may store unique identities of subscribers currently connected to and served by the EDG 102.

The synchronization data 222 refers to data that is to be propagated to a finite list of additional physical locations (such as EDG 102 nodes), all of which are maintained in a consistent state when any single location is updated. Tokens may be propagated along the sub-token path and may be updated as EDG 102 nodes are entered on the chain. The synchronization data 222 may maintain consistency of the sub-tokens along the various EDG 102 nodes. As previously described, at service enrollment a token is created at an EDG 102 to which the DPA 112 is bound. Once the token is created it may be propagated, as sub-tokens, in the blockchain network of EDG 102 nodes for multi--node storing. These nodes may participate in the subsequent requests of token validation. The sub-token path across EDG 102 nodes is maintained through the synchronization data 222. Trail paths among EDG 102 nodes belonging to a blockchain set are created and initialized by a VNF orchestrator upon EDG instantiation and deployment.

The state management 224, where state can generally refer to a condition, configuration, or other status of, for example, an EDGE VNF may store the context of EDG 102 VNFs (such as application status, sessions information, smart contracts transaction state) for the execution of transactions and transition to the next state and validation, as well as for scaling out EDG-stateless instances in case of overload or in case of node fault. EDG 102 nodes belonging to a common blockchain set may share the same context. EDG 102 VNFs may maintain session data in various ways. Each technique may be associated with a fault zone of a particular scope within a solution. A fault zone is defined as the perimeter of effect when a given component is rendered inactive or unavailable from the point of view of the larger solution.

One example of maintaining the session data includes using hash tables maintained within the address space of a process or service. This method is employed to manage contextual data that is highly dynamic. An example would be the storage of the HTTP/2 stream information within a protocol gateway virtual network function component (VNFC). The data is associated with a particular HTTP/2 connection. Because the connection terminates within a single process, the necessary scope of visibility and access to the state is confined to the process handling the connection. The fault zone of this data is the perimeter of the executing VNFC instance. Loss of the VNFC instance results in the loss of the data. This is appropriate because the fault zone of the HTTP/2 connection is the instance itself.

Another example of maintaining the session data includes doing so between process instances on a compute node. In order to keep the instance context free, sufficient information is assembled and associated with a unique identifier. To reacquire the context the identifier is echoed back by the process at the far end of a network connection. In this example the term "far" is a relative term to a given compute node. The information is written into shared memory, permitting memory-speed access. When the response is received the application logic will retrieve the information from the shared memory construct. Ordinarily this process is expedited by structuring the messaging patterns so that messages processed remotely are returned to the original sender for completion. Occasionally this is not possible, in which case is it sometimes necessary to route the response to the shared memory that contains the information such as across virtual machines (VMs) or container boundaries. The fault zone for this type of information is the shared memory and surrounding processes. The scope is greater than an individual process instance but less than that of a complete VNF. It should be noted that a process stopping and restarting will not cause the information to be lost.

The unique identity repository 220 may include one or more cache(s) 230. The cache(s) 230 may serve as temporary data storage areas for transaction processing at an EDG 102. As will be described further below with respect to FIG. 3, the cache(s) 230, together with other cache(s) 230 of other EDGs 102, form a shared data layer among the EDGs 102.

Figure 3:
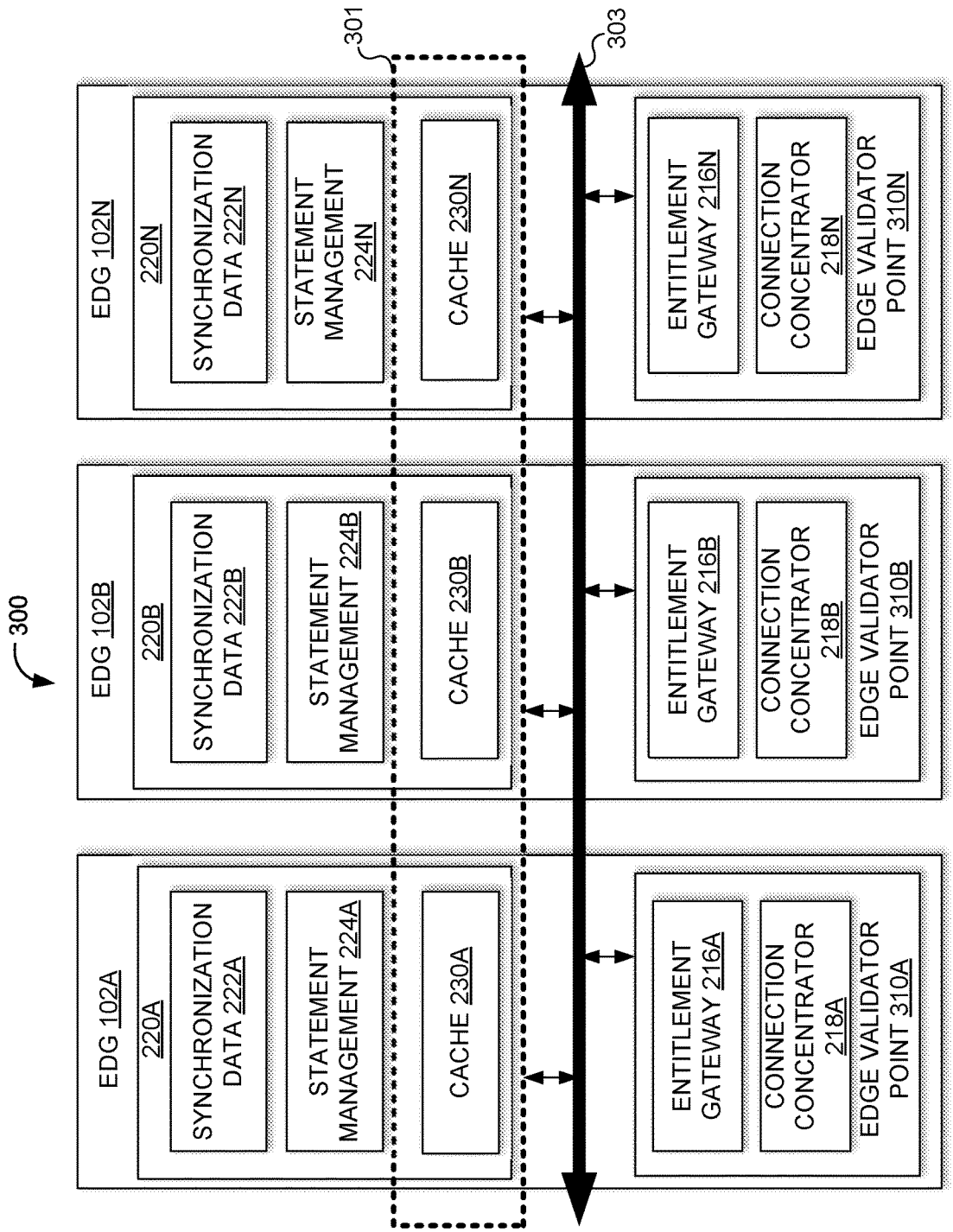
FIG. 3 illustrates an example of an architecture for a shared data layer among edge digital gates, according to an implementation of the disclosure.

FIG. 3 illustrates an example of an architecture 300 for a Shared Data Environment ("SDE") 301 among edge digital gates 102A-N, according to an implementation of the disclosure. It should be understood that like reference symbols in FIGS. 2 and 3 for a given EDG 102A-N represent the same elements.

The Shared Data components 301 comprises a plurality of edge-based instances of unique identity repositories 220A-N, which themselves may be micro-databases. As such, the SD 301 enables the EDGs 102 to form a Shared Data Environment ("SDE") 303. The SDE 303 may provide data sharing and connections to form the blockchain network 130, as will be described with respect to FIG. 4. Individually each unique identity repository 220 stores only those subscribers presently being served by the corresponding EDG 102 and tokens for rebuilding transaction status. Collectively, all instances of unique identity repositories 220 represent the full subscriber and enterprise population served by the blockchain network 130.

In some implementations, persistence and resistance to information loss of the SDE 303 may achieved through a database implementation. For example, each cache 230 may be configured to move data from its in-memory cache to a persistent storage database with variable degrees of aggressiveness. The perimeter of the database itself, often a shard, also defines the fault zone. State information, data that reflects the state of a connection to an entity like a voice subscriber, an IoT device, or a business entity that is stored in the database will survive complete shutdown of a solution.

The SDE 303 may include a microservice that can provide data storage for multiple EDG Network Entitlement Functions ("NFs"), which may be either distributed or centralized. It should be understood that a microservice can refer to, e.g., one of or some subset of functions that operate together with other microservices to effectuate a general application or function. The SDL 301 may be centralized while for large deployment with e.g. mobile edge computing (MEC), the function may be distributed closer to the EDG NFs requiring its service.

Additionally, each of EDG 102A, 102B, and 102N may further comprise edge validator points 310A, 310B, and 310N, respectively. Each of edge validator points 310A, 310b, and 310N may include respective entitlement gateways 216A, 216B, 216N, and respective connection concentrators 218A, 218B, and 218N.

Figure 4:
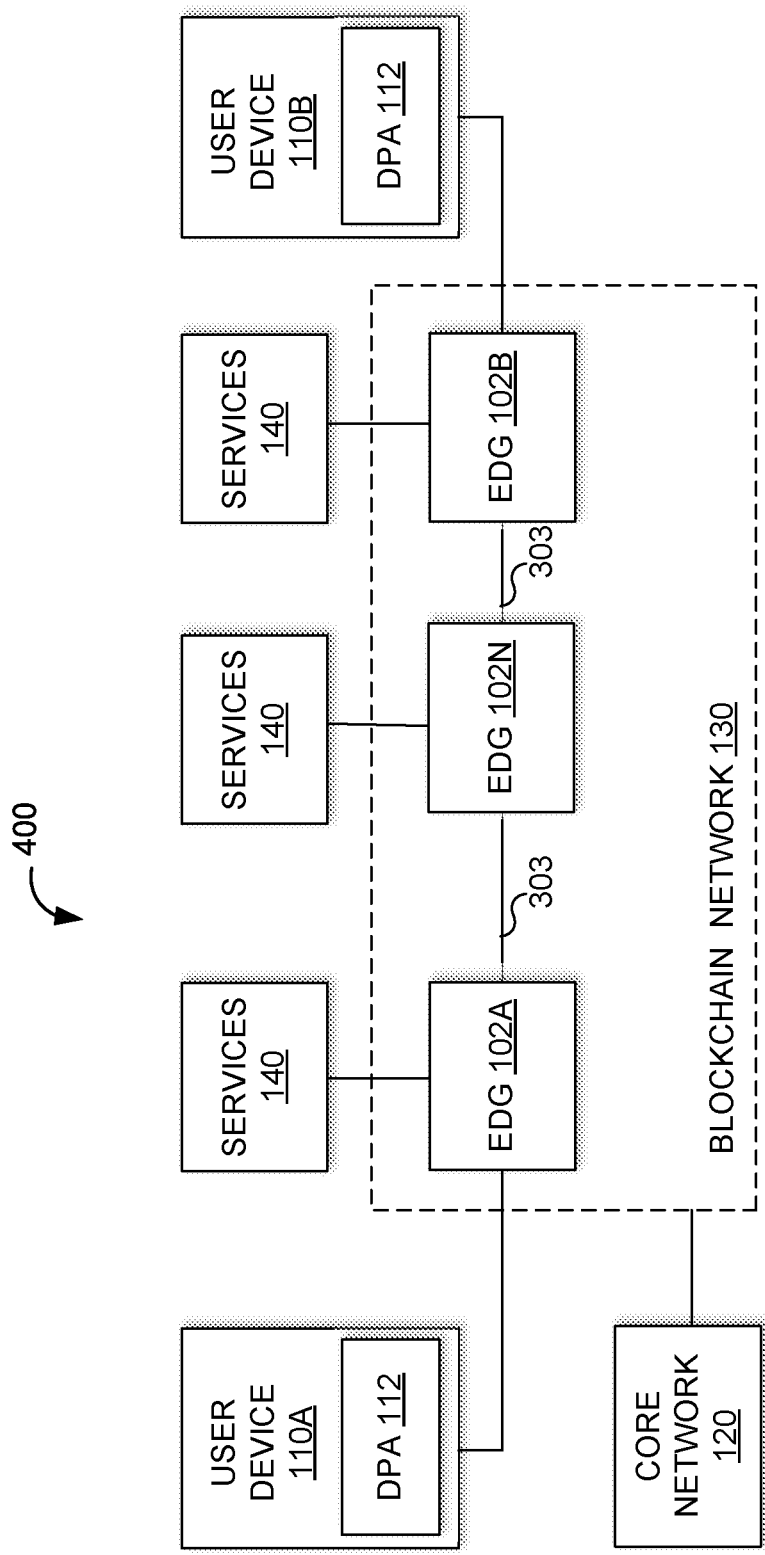
FIG. 4 illustrates an example of edge digital devices deployed as distributed edge nodes in a blockchain network for providing access to blockchain-based services, according to an implementation of the disclosure.

FIG. 4 illustrates an example of edge digital devices 102A-N deployed as distributed edge nodes in a blockchain network 130 for providing access to blockchain-based services, according to an implementation of the disclosure.

The SDE 303 formed by the plurality of EDGs 102 may provide the data connections to form the blockchain network 130. As such, each EDG 102A-N may act as a blockchain node. The SDE 303 provides a distributed and shared cache that is check-pointed by EDG stateless network functions for blockchain service demand and access, facilitating distributed consensus for validating the sanctity of each transaction submitted to the blockchain network 130. Through SDE 303, the stateless VNFs of the EDGs 102 disperse transaction-status behind a smart contract 136 in the blockchain network 130 as elementary tokens.

The blockchain network 130, formed from EDG 102A-N using MEC technologies, behaves as a distributed state machine, residing at or near the network edge, able to store and validate status and transactions based on a smart contract 136, which may be executed on behalf of a an entity, as represented by the DPA 112. Each EDG 102 in the blockchain network 130 may act as an authoritative micro-database and network edge validator node in a person-to-person (P2P) transaction. Each EDG 102 may establish trust and enable access to one or more of the services 140. The EDG 102 may be deployed at the network edge, optionally within Multi-Access Edge Computing (MEC) nodes, and selected either through 5G Network Slice Selection and/or through by way of an edge-based GTP Router.

As such, the blockchain network 130 composed of EDGs 102 provides the ability to manage identities and, in addition, provide the required trail of digital of records and connections, identifiers, and means of authentication. Such trail may include subscriber activity such as access to services 140, enrollment in services 140, transactions executed by the entity, and/or other activity of entities using the system 100. Deployed at or near the network edge, independently or within a MEC environment, or even centrally from the core network 120 (for example), the blockchain network 130 may correlate identities for users, subscribers, devices and their various relationships in the execution of transactions and smart contracts 136. When deployed at or near the network edge, for example, each EDG 102 may service a user device 110 through its DPA 112. For example, as illustrated, an EDG 102A may service a user device 110A and an EDG 102N may service a user device 110N. In some instances, a given user device 110 may be mobile and connect to the telecom network through different access points. The user device 110 may be routed to a given EDG 102 based, at least in part, on the location of the user device 110 in the network (as determined, for example, on the access point to which the user device 110 is connected).

As previously noted, an entity operating or associated with the user device 110 may be represented through the DPA 112, accesses or subscribes for services 140 on behalf of the entity. The services 140 may be consumed as value added interactions or sessions. Value received would be agreed and paid through on-demand smart contracts 136 validated through a chain of EDGs 102.

The EDG 102, through a client-server relationship with the DPA 112, may issue entitlements to the services 140 based on the digital persona represented by the DPA 112. The entitlements may be maintained by multiple EDGs 102, facilitating secure and auditable access to services 140. When the entity wishes to exchange value with another entity through the telecom network, the value exchange may be recorded in the decentralized ledger 134, a full or at least partial copy of which may be stored, such as via the SDE 303. The transaction indicating such value exchange may be distributed to a cluster of EDGs 102 acting as validators who would undertake "proof of work" to validate the transaction, compare their results, and generate the latest block in the decentralized ledger 134. Individuals and enterprises contracting with the MNO for blockchain-based services, may interact with a particular EDG 102. The MNO would house the various digital identities representing this entity.

The validator cluster may be associated with the communication cores providing connectivity and communication services to the entity. Parallelism, and thereby performance and scalability, would be achieved by being able to create new slices of EDG 102, and thereby new validation clusters, as needed. Creating a new slice would involve allocating the physical and software resources to support the slice and associating it with the correct digital identities. As such, resources of a given EDG 102 may be reserved and released as needed to support validation and recordation activities at scale.

Services rendered to physical entities would be obtained through smart contracts 136 with the provider of the service 140. The provider of the service 140 could be the MNO itself or it could be a separate individual or enterprise. In such manner the MNO may deliver complex services to downstream end-user customers in partnerships with upstream suppliers such as application developers, content providers, utilities, other MNOs, health service providers, and others.

As described above, a new application structure is provided for the telco blockchain node, the Edge Digital Gate (EDG), allowing implementation of a blockchain mechanism in a virtualized EDG deployment, over a set of edge computing nodes deployed within the network of a telco operator. Also described is ability of the HPE Shared Data Environment (SDE) to insure data concurrency and consistency among geographically distributed repositories. This SDE allows for the chaining of K EDG nodes, among n, into $\binom{n}{k}$ sub-topologies. Each sub-topology allocation realizes a blockchain instantiation for a specific purpose. Each blockchain instantiation is referred to herein as a "sub-blockchain."

The described embodiments provide instantiation of a telco blockchain in an NFV environment. The blockchain topologies may be defined through policies described in an overall Policy Graph Abstraction (PGA). The use of such PGAs is described, for example, in "PGA: Using Graphs to Express and Automatically Reconcile Network Policies" by Prakash, et al., SIGCOMM 2015, Aug. 17-21, 2015, London, United Kingdom. The PGA is then used to construct the Service Function Chain for the blockchain-topology network service being defined. In this way a blockchain is a service chain that, once described, can be deployed by an orchestrator, scaled as needed, and/or released based on workload demand, available power, resource availability, network status, or other criteria.

Various embodiments are described according to the reference architecture described in the document "Mobile Edge Computing (MEC); End to End Mobility Aspects" ETSI GR MEC 017 V1.1.1 (February 2018) (referred to herein as the "ETSI architecture"). However, it should be understood that the embodiments described herein are not limited to such architectures.

According to the disclosed embodiments, a blockchain topology is defined as a set of network units, realized as a chain of VNFs, governed by a service orchestrator able to provide optimal placement in a distributed physical infrastructure. This is accomplished through the NFV MANO system, balancing operational parameters such as network resilience, service performance, QoS, QoE, latency, computing efficiency and power consumption.

With the disclosed embodiments, the efficiency of creating and deploying blockchain topologies can be increased using an orchestrator service to create blockchain "slices" without over-engineering the underlying infrastructure. The proposed approach overcomes the current inefficiencies in blockchain deployment by minimizing growth in storage size, improving power efficiency and resource utilization in a distributed computing environment, and enabling scalability for accommodating the throughput requirements of a telecommunication environment.

Before providing further description, several terms are defined.

Network Function Virtualization (NFV) is the transformation of network elements originally implemented and deployed atop purpose build hardware platforms and operating system personalities into software modules that run on commodity hardware and operating systems, and can be licensed and administered independently of the underlying hardware by employing hypervisor or container technologies.

Virtualized Network Functions (VNFs) are software images representing network elements, mapped onto virtual machines or containers (e.g. Docker).

A Virtual Machine (VM) is a software emulation of a physical computer system. Virtual machines are based on computer architectures and provide functionality of a physical computer.

In the described embodiments, a telco blockchain is realized as a set of network units to be optimally placed by the NFV MANO system by balancing operational parameters (e.g. network resilience, service performance, QoS and QoE). Each network unit is a chain of VNFs. Mapping these virtual resources to physical resources involves making decisions on the optimal placement of the virtualized resources. Virtualized resource placement is quite difficult, and is defined mathematically as an NP-hard problem.

Figure 5:
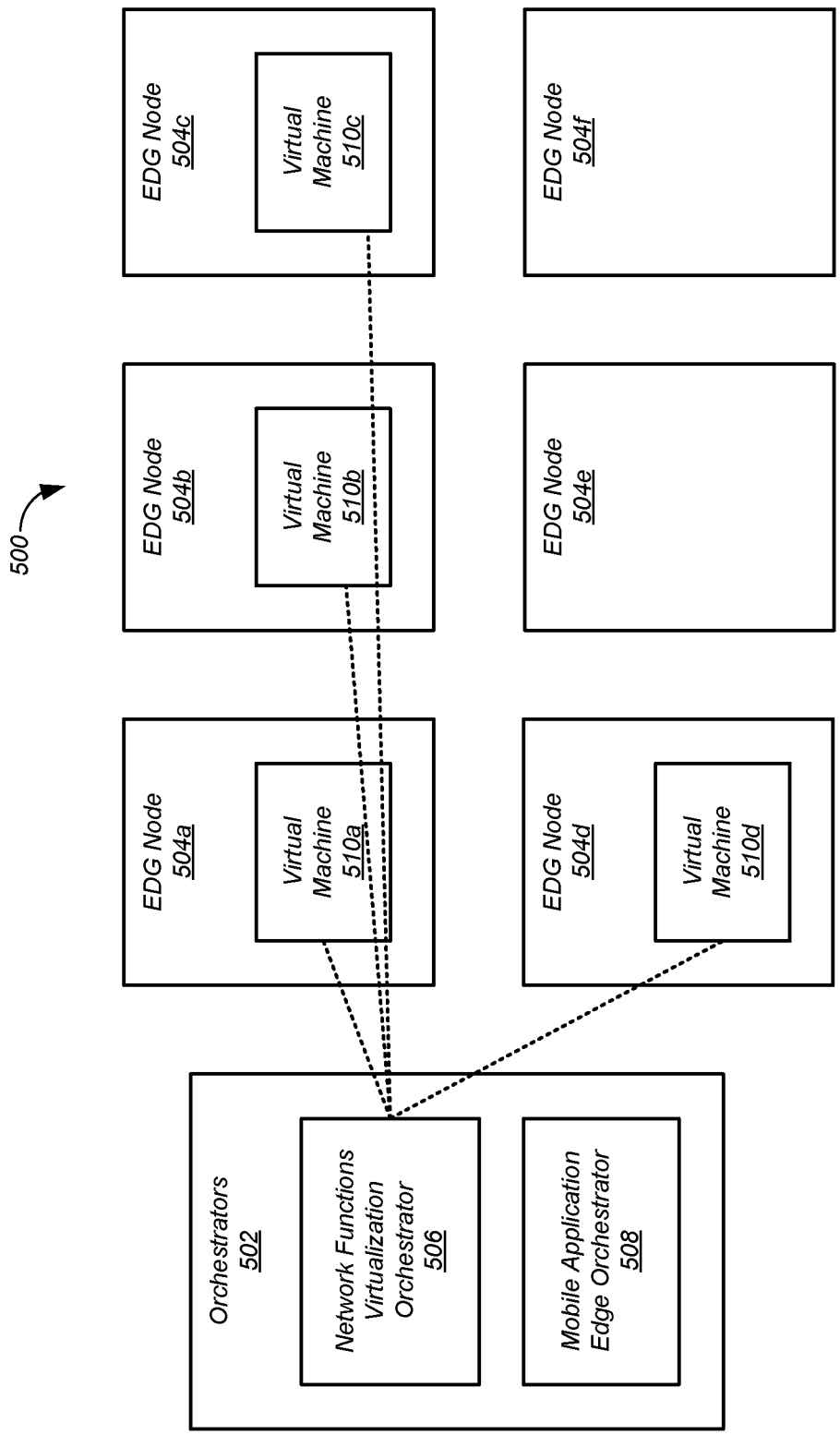
FIG. 5 is a block diagram of the architecture which will be used to describe various embodiments.

FIG. 5 is a block diagram of the ETSI architecture which will be used to describe various embodiments. Referring to FIG. 5, the architecture includes orchestrators 502 and a Mobile Edge Compute (MEC) platform 500. The MEC platform 500 may be deployed as a collection of EDG nodes 504$a,b,c,d,e,f$ to support virtualized network functions (VNFs), and can be managed using procedures defined by the ETSI NFV Working Groups. Each of the EDG nodes 504$a,b,c,d,e,f$ (i.e. cores) may support a VM 510$a,b,c,d$.

The orchestrators 502 include a Network Functions Virtualization (NFV) orchestrator (NFVO) 506 and a Mobile Application Edge orchestrator 508 (MEAO). The orchestrators 502 employ two algorithms—the K-means and ACS algorithms—as blockchain-specific enhancements in the MEA orchestrator 508 and the NFV orchestrator 506. The service orchestration layer implemented by the MEA orchestrator 508 is enhanced with the capability to model the service graph(s) for the various EDG sub-topologies by generating the blockchain path among the $\binom{n}{k}$ sub-topologies. The NFV orchestrator 506 is enhanced with the proper capabilities to obtain a blockchain topology from the service orchestration layer, in the form of a group VNFs/VMs. The algorithm calculates the resources for placing the group of VMs simultaneously. The output is used for group VM placement on the NFV infrastructure.

In the described embodiments, the blockchain placement process is a multi-objective problem intended to minimize cost, maximize performance, maximize reliability, minimize latency, and minimize power consumption. The EDG node to VNF affinity is determined by mimicking Ant Colony behavior through the utilization of NFV management techniques combined with an AntColonySystem algorithm (ACS) in the orchestrators 502. ACS is described in detail in "A multi-objective ant colony system algorithm for virtual machine placement in cloud computing" by Gao et al., Journal of Computer and System Sciences (2013).

The NFV orchestrator 506 employs ACS as a mechanism for building the policy graphs needed to identify the sub-topology of virtualized blockchain nodes for a particular service. The proposed solution solves for a multi objective goal including network topology, CPU loads, computing location deployment, etc. ACS is a metaheuristic inspired by the observation of real ant colonies. While moving, ants deposit special substances called pheromones along their paths. Ants can detect pheromones. When choosing a path they show a preference for paths identified by the strongest pheromone concentrations. As soon as an ant finds a food source, it evaluates the quantity and the quality of the food and carries some of it back to the nest. The indirect communication between the ants via pheromone trails enables them to find the shortest paths between the nest and a food source. Accordingly, the affinities below are defined.

Ant Colony: The set of EDG nodes enabled with blockchain support.

Blockchain support: set of EDG nodes marked with a pheromone-like value.

Pheromone: Macro Token coding info about Access, Service ID, Smart Contract, transactions status, session information, subscriber data.

Nest: The initial Edge Digital Gate (EDG) to which the user is connected via a digital passport on an eSIM, and on which a blockchain controller application (BCA) executes requested Smart Contract transactions.

Food: The ultimate node or end EDG-node in the chain (aka trail path) instantiated by the BCA at service execution, through smart contract transaction decomposition, execution and dispersion, based on the objective function specified by the corresponding service request (e.g. minimum latency, energy efficiency, and the like).

Blockchain Controller Application (BCA): A MEC VNF Application deployed on top of EDG nodes to instantiate a trail path, among $S^K$ possible trails on the available set of K EDG nodes.

Trail Path: Path from Nest EDG to Food EDG. Given a set of K Nodes, marked with a pheromone-like intensity, and a set of S transactions belonging to a smart contract, there are a total of $S^K$ possible trail paths to instantiate. Each EDG node of a trail path can act as Nest or Transit or Food node. The behavior of the EDG node is dynamically selected by the BCA on the Nest EDG. Each K path represents a non-deterministic topology. It is a subgraph of edge nodes, and will constitute a particular blockchain S-path (aka the path over which the S transaction states of a certain smart contraction will be stored).

Pherotoken: Micro tokens arising from the decomposition of a Macro Token from the BCA. The micro tokens, once decomposed from the macro token, are dispersed on the trail path over the EDG nodes. The ultimate node of a trail path acts as a micro-food source of a sub-blockchain "path" across a multi-node path. Each EDG node of the sub-blockchain owning a segment token acts as food station.

Initialized trail paths: Trail paths initialized by pheromone deposit at VM instantiation, provisioned by the service orchestration layer, and auto-tuned by the BCA. A pherotoken trail is invoked at each service request by the BCA on the selected trail paths. This prevents overloading of individual nodes, and distributes the burden in a reasonably even manner under conditions that are not possible to predict at configuration time. The pherotoken trail path is selected based on the pheromone value ("pheromone intensity") present among the possible paths emanating from the starting node (the nest).

Food station EDG nodes that store micro-tokens act as a Miner's ledger in blockchain terminology for the smart contract transaction state being executed. The transit nodes grant the reachability of food-nodes from nest nodes. The ACS behavior self-adapts in case of an obstacle in the path, e.g. a fault of a transit node due to an underlying VM failure. The self-organized and auto-adaptive nature of ACS allows the system to work around the potential fault in the transit nodes by selecting an alternate admitted pheromone path.

Figure 6:
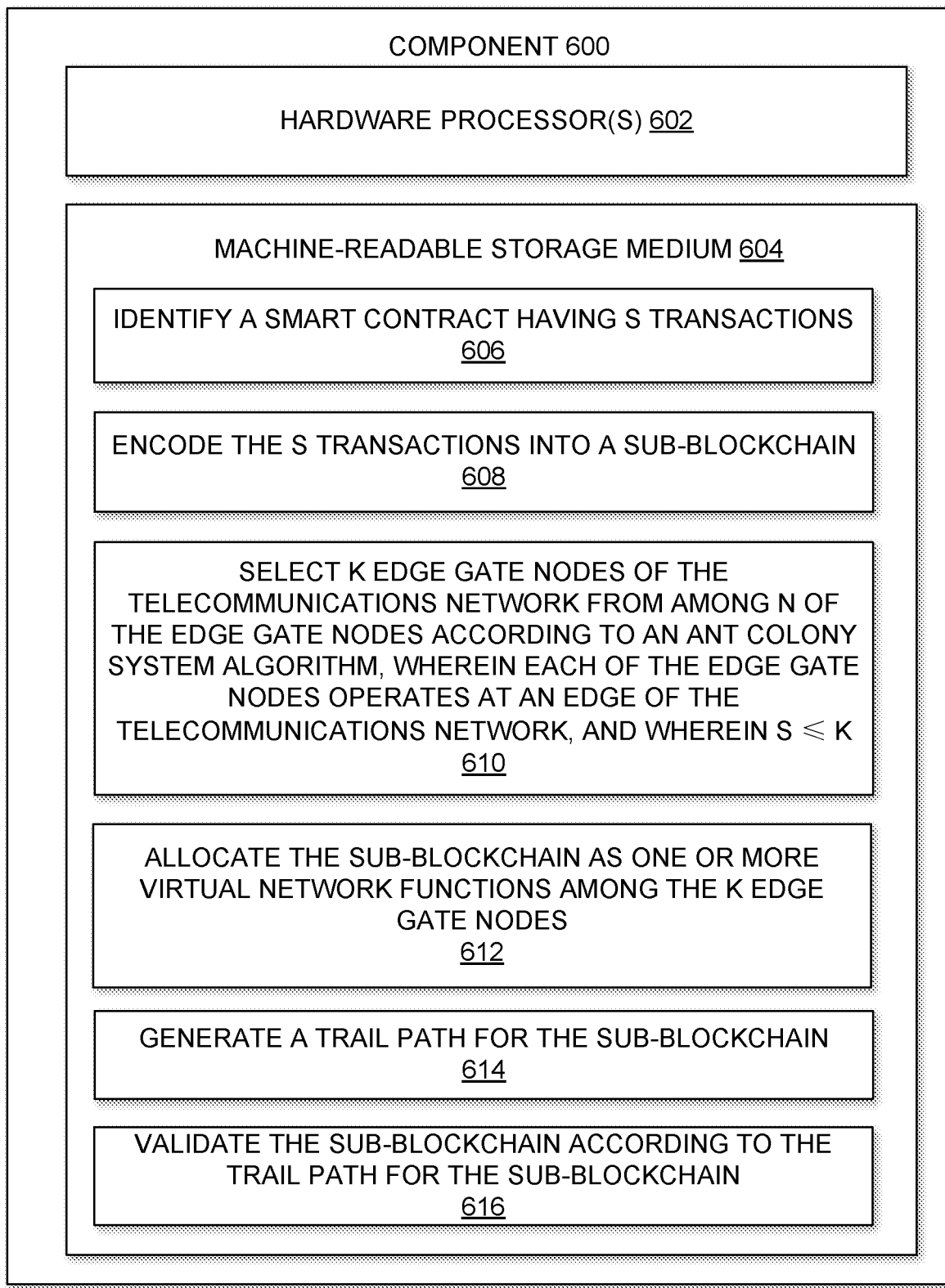
FIG. 6 is a block diagram of an example computing component or device for instantiation of a telco blockchain in a NFV environment in accordance with one embodiment.

FIG. 6 is a block diagram of an example computing component or device 600 for instantiation of a telco blockchain in a NFV environment in accordance with one embodiment. Computing component 600 may be, for example, a server computer, a controller, or any other similar computing component capable of processing data. In the example implementation of FIG. 6, the computing component 600 includes a hardware processor, 602, and machine-readable storage medium, 604.

In some embodiments, computing component 600 may be an embodiment of an orchestrator 602, for example including the NFV orchestrator 606, the MEA Orchestrator 608, or any combination thereof.

Hardware processor 602 may be one or more central processing units (CPUs), semiconductor-based microprocessors, and/or other hardware devices suitable for retrieval and execution of instructions stored in machine-readable storage medium, 604. Hardware processor 602 may fetch, decode, and execute instructions, such as instructions 606-616, to control processes or operations for instantiating a blockchain in an NFV environment. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 602 may be a non-transitory storage medium, where the term "non-transitory" does not encompass transitory propagating signals. As described in detail below, machine-readable storage medium 602 may be encoded with executable instructions, for example, instructions 606-616.

Hardware processor 602 may execute instruction 606 to identify a smart contract having S transactions. The smart contract may be identified as part of a request to allocate a blockchain topology along with a multi objective function to be satisfied. The request may be received by the Service Orchestration layer of the NFV orchestrator 506.

Hardware processor 602 may execute instruction 608 to encode the S transactions into a sub-blockchain. The NFV orchestrator 506 may model the blockchain topology as an EDG service graph, generating the required blockchain trail path among the various VNF/EDG node 504 combinations for the $\binom{n}{k}$ sub topologies. Encoding the S transactions into a sub-blockchain may include encoding the S transactions into a macro token.

The NFV orchestrator 506 may calculate the number K of the EDG nodes 504 by applying the K-Means algorithm. Descriptions of K-means algorithms may be found at least in Kanungo, et al. "An efficient K-means clustering algorithm: Analysis and implementation," IEEE Trans. Pattern Analysis and Machine Intelligence (2002); and Wagstaff, et al., "Constrained K-means Clustering with Background Knowledge," Proceedings of the Eighteenth International Conference on Machine Learning, 2001, p. 577-584 (2001).

The NFV orchestrator 506 may output a service with the required size K of EDG nodes 504 that is able to satisfy the required multi-objective function over N physical deployed EDG nodes 504. The NFV orchestrator 506 may generate the blockchain topology service function chain using a series of descriptors such as EDG_VNF instance descriptors (VN-FIDs) as per the ETSI MANO specification.

The NFV orchestrator 506 may validate the consistency of the required service graph deployment against the underlying NFV infrastructure environment. A blockchain topology may be placed only if all of its VNFs/VMs can be placed simultaneously. In particular, the NFV orchestrator 506 allocates the sub-blockchain only when all of the VNFs may be allocated simultaneously. After validation, the NFV orchestrator 506 calculates the necessary resources (e.g. compute resources, network resources, etc.) for realizing the requested service by referring to various inventory databases.

Hardware processor 602 may execute instruction 610 to select K edge gate nodes of the telecommunications network from among N of the EDG nodes 504 according to an ant colony system algorithm, where S≤K. As discussed above, each of the EDG nodes 504 operates at an edge of the telecommunications network.

Figure 7:
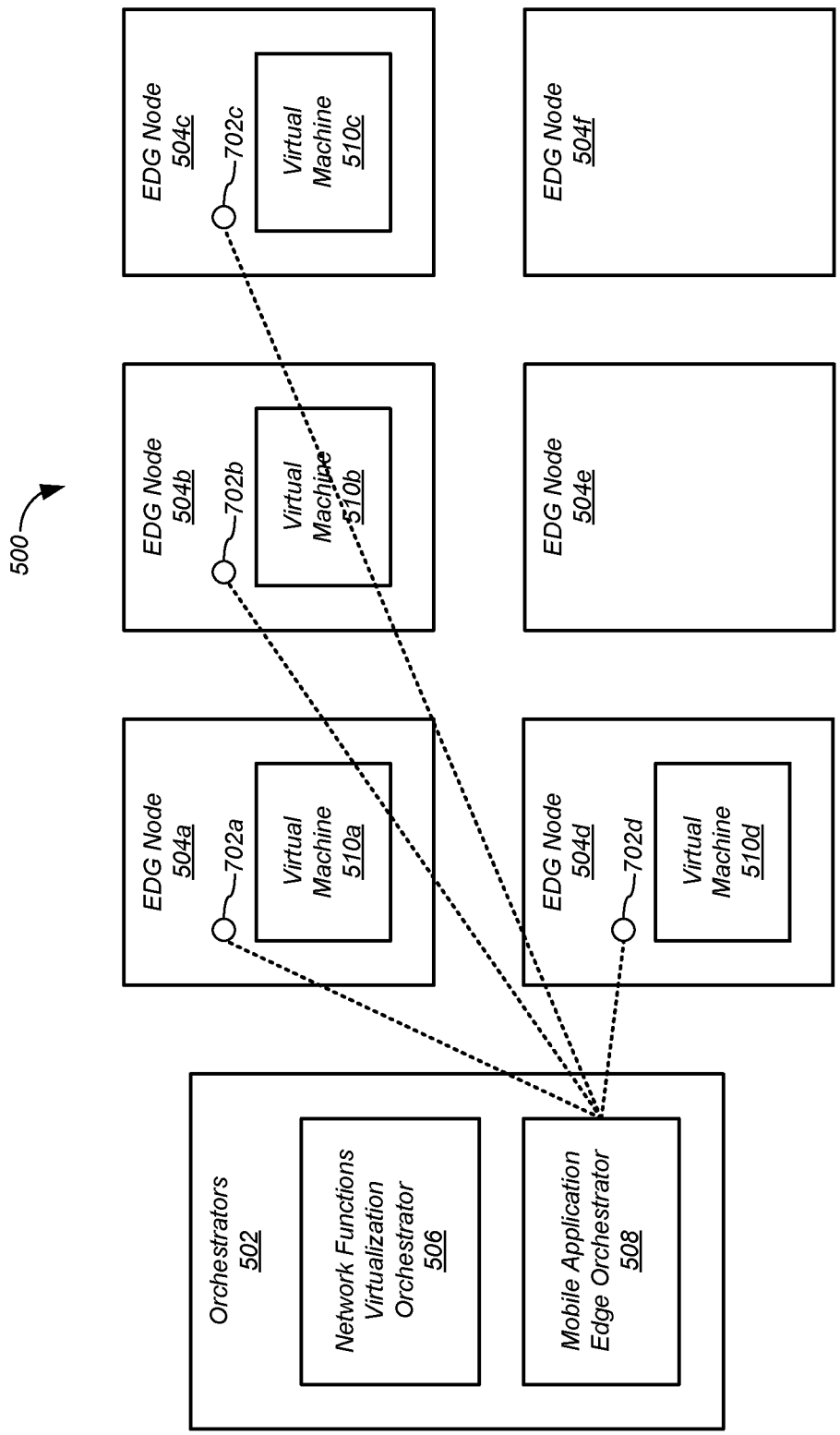
FIG. 7 is a block diagram of the architecture of FIG. 5 with micro tokens shown as associated with nodes.

Hardware processor 602 may execute instruction 612 to allocate the sub-blockchain as one or more virtual network functions among the K EDG nodes 504. This may include segmenting the macro token into at least one micro token, and storing each micro token on one of the K EDG nodes 504a,b,c,d. In particular, the MEA orchestrator 508 generates a blockchain forwarding graph for the sub-blockchain, by associating a respective pheromone value with each of the K EDG nodes 504. FIG. 7 is a block diagram of the ETSI architecture of FIG. 5 with micro tokens 702a,b,c,d shown as associated with EDG nodes 504a,b,c,d.

Figure 8:
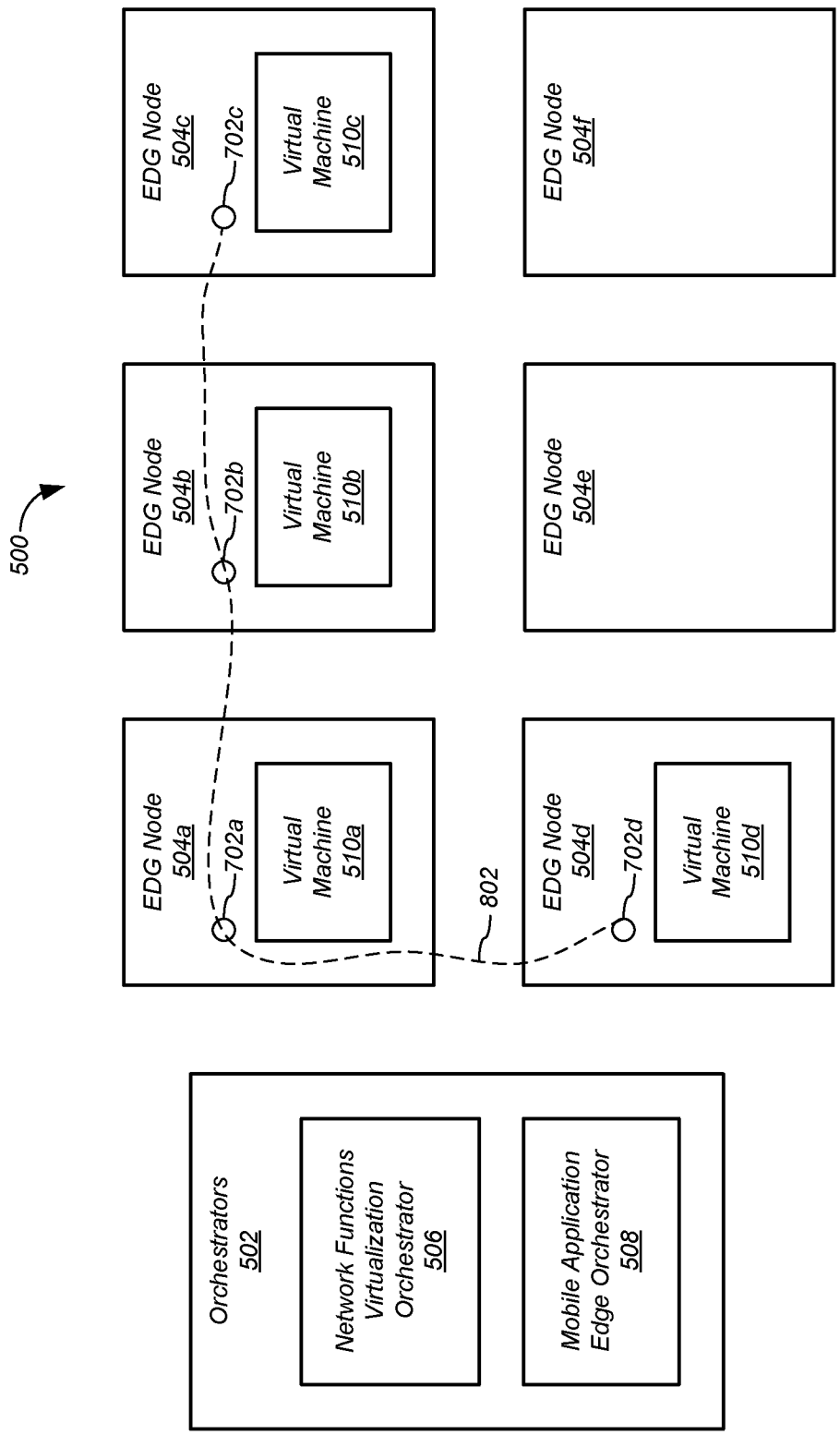
FIG. 8 is a block diagram of the architecture of FIG. 7 with a trail path connecting the pheromone deposits.

Hardware processor 602 may execute instruction 614 to generate a trail path for the sub-blockchain. Each step of generating the trail path may include selecting one of the K edge gate nodes according to the pheromone values. FIG. 8 is a block diagram of the ETSI architecture of FIG. 7 with a trail path 802 connecting the pheromone deposits 702a,b,c,d.

At some later time, a user may request a validation of the sub-blockchain. In response, hardware processor 602 may execute instruction 616 to validate the sub-blockchain according to the trail path 802 for the sub-blockchain.

Figure 9:
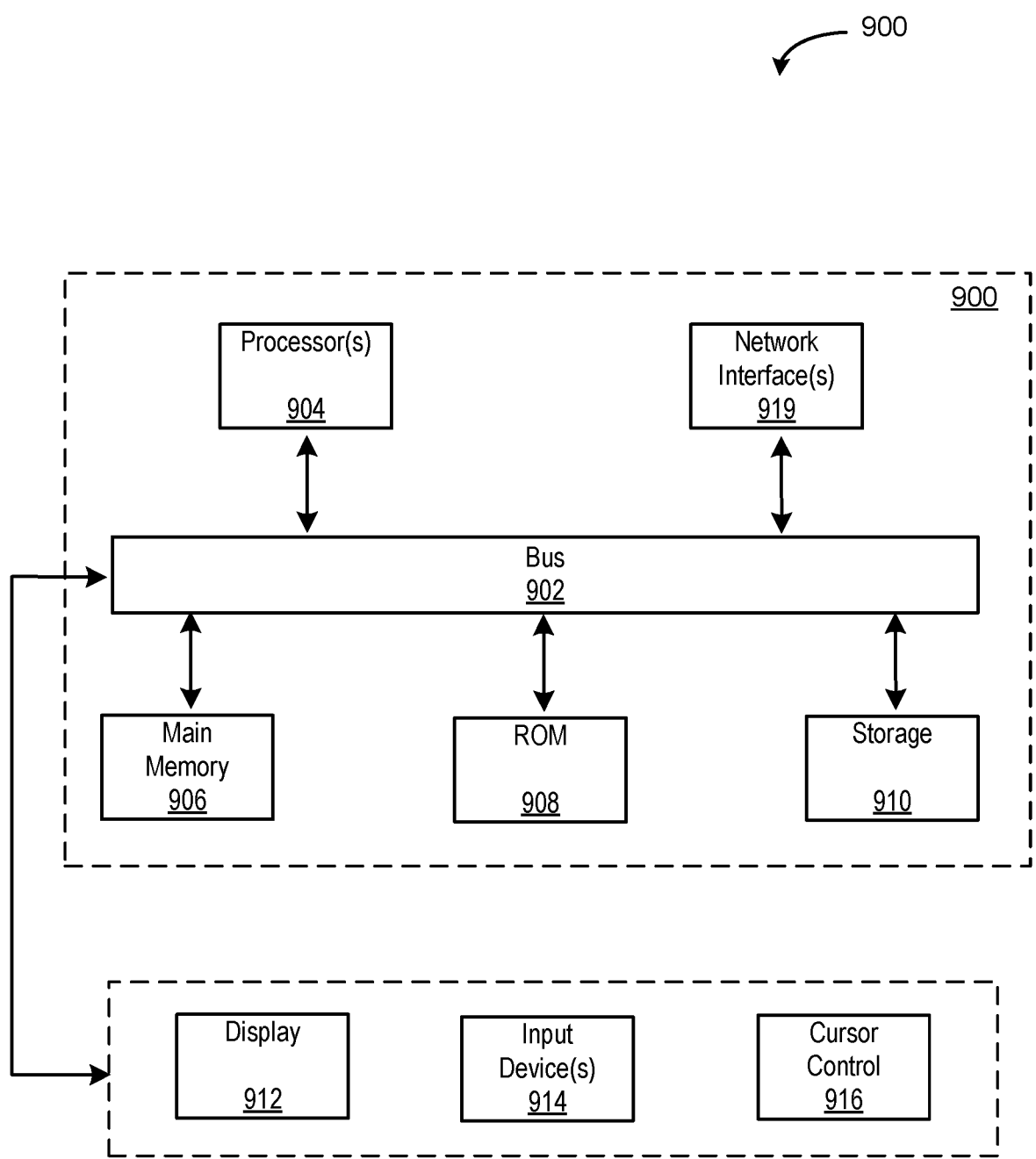
FIG. 9 depicts a block diagram of an example computer system in which various of the embodiments described herein may be implemented.

FIG. 9 depicts a block diagram of an example computer system 900 in which various of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hardwired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a communication interface 918 coupled to bus 902. Network interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, network interface 918 may be a local area network (LAN) card to provide a data communication connection to a compatible LAN (or WAN component to communicated with a WAN). Wireless links may also be implemented. In any such implementation, network interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for instantiating a blockchain in a telecommunications network, the method comprising:
   identifying a smart contract having S transactions;
   encoding the S transactions into a sub-blockchain;
   selecting K edge gate nodes of the telecommunications network from among N of the edge gate nodes according to an ant colony system algorithm, wherein each of the edge gate nodes operates at an edge of the telecommunications network, and wherein S≤K; and
   allocating the sub-blockchain as one or more virtual network functions among the K edge gate nodes.

2. The method of claim 1, further comprising:
   generating a blockchain forwarding graph for the sub-blockchain, comprising associating a respective pheromone value with each of the K edge gate nodes.

3. The method of claim 2, further comprising:
   generating a trail path for the sub-blockchain, comprising selecting one of the K edge gate nodes according to the pheromone values.

4. The method of claim 3, further comprising:
   validating the sub-blockchain according to the trail path for the sub-blockchain.

5. The method of claim 1, further comprising:
   calculating K according to a K-means algorithm.

6. The method of claim 1, wherein:
   encoding the S transactions into a sub-blockchain comprises encoding the S transactions into a macro token; and
   allocating the sub-blockchain as one or more virtual network functions among the K edge gate nodes comprises:
      segmenting the macro token into at least one micro token, and
      storing each micro token on one of the K edge gate nodes.

7. A system, comprising:
   a hardware processor; and
   a non-transitory machine-readable storage medium encoded with instructions executable by the hardware processor to perform a method for instantiating a blockchain in a telecommunications network, the method comprising:
      identifying a smart contract having S transactions;
      encoding the S transactions into a sub-blockchain;
      selecting K edge gate nodes of the telecommunications network from among N of the edge gate nodes according to an ant colony system algorithm, wherein each of the edge gate nodes operates at an edge of the telecommunications network, and wherein S≤K; and
      allocating the sub-blockchain as one or more virtual network functions among the K edge gate nodes.

8. The system of claim 7, the method further comprising:
   generating a blockchain forwarding graph for the sub-blockchain, comprising associating a respective pheromone value with each of the K edge gate nodes.

9. The system of claim 8, the method further comprising:
   generating a trail path for the sub-blockchain, comprising selecting one of the K edge gate nodes according to the pheromone values.

10. The system of claim 9, the method further comprising:
    validating the sub-blockchain according to the trail path for the sub-blockchain.

11. The system of claim 7, the method further comprising:
    calculating K according to a K-means algorithm.

12. The system of claim 7, wherein:
    encoding the S transactions into a sub-blockchain comprises encoding the S transactions into a macro token; and
    allocating the sub-blockchain as one or more virtual network functions among the K edge gate nodes comprises:
       segmenting the macro token into at least one micro token, and
       storing each micro token on one of the K edge gate nodes.

13. The system of claim 7, the method further comprising:
    allocating the sub-blockchain only when all of the virtual network functions may be allocated simultaneously.

14. A non-transitory machine-readable storage medium encoded with instructions executable by a hardware processor of a computing component, the machine-readable storage medium comprising instructions to cause the hardware processor to perform a method for instantiating a blockchain in a telecommunications network, the method comprising:
    identifying a smart contract having S transactions;
    encoding the S transactions into a sub-blockchain;
    selecting K edge gate nodes of the telecommunications network from among N of the edge gate nodes according to an ant colony system algorithm, wherein each of the edge gate nodes operates at an edge of the telecommunications network, and wherein S≤K; and
    allocating the sub-blockchain as one or more virtual network functions among the K edge gate nodes.

15. The medium of claim 14, the method further comprising:
    generating a blockchain forwarding graph for the sub-blockchain, comprising associating a respective pheromone value with each of the K edge gate nodes.

16. The medium of claim 15, the method further comprising:
    generating a trail path for the sub-blockchain, comprising selecting one of the K edge gate nodes according to the pheromone values.

17. The medium of claim 16, the method further comprising:
    validating the sub-blockchain according to the trail path for the sub-blockchain.

18. The medium of claim 14, the method further comprising:
    calculating K according to a K-means algorithm.

19. The medium of claim 14, wherein:
    encoding the S transactions into a sub-blockchain comprises encoding the S transactions into a macro token; and
    allocating the sub-blockchain as one or more virtual network functions among the K edge gate nodes comprises:
       segmenting the macro token into at least one micro token, and
       storing each micro token on one of the K edge gate nodes.

20. The medium of claim 14, the method further comprising:
    allocating the sub-blockchain only when all of the virtual network functions may be allocated simultaneously.

* * * * *